(12) United States Patent
Liu et al.

(10) Patent No.: US 12,549,256 B2
(45) Date of Patent: Feb. 10, 2026

(54) OPTICAL RELAY DEVICE, SIGNAL TRANSMISSION SYSTEM AND METHOD

(71) Applicant: BOE Technology Group Co., Ltd., Beijing (CN)

(72) Inventors: Yuehua Liu, Beijing (CN); Qiuyun Tan, Beijing (CN); Biqi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 249 days.

(21) Appl. No.: 18/271,252

(22) PCT Filed: Feb. 18, 2022

(86) PCT No.: PCT/CN2022/076879
§ 371 (c)(1),
(2) Date: Jul. 7, 2023

(87) PCT Pub. No.: WO2023/155150
PCT Pub. Date: Aug. 24, 2023

(65) Prior Publication Data
US 2025/0007611 A1    Jan. 2, 2025

(51) Int. Cl.
*H04B 10/00* (2013.01)
*H04B 10/29* (2013.01)
*H04B 10/50* (2013.01)
*H04B 10/516* (2013.01)
*H04J 14/00* (2006.01)

(52) U.S. Cl.
CPC .......... *H04B 10/29* (2013.01); *H04B 10/503* (2013.01); *H04B 10/516* (2013.01)

(58) Field of Classification Search
CPC .................. H04B 7/15; H04B 10/29
See application file for complete search history.

(56) References Cited

U.S. PATENT DOCUMENTS

| 11,032,007 B1* | 6/2021 | Parker ............... H04B 10/29 |
| 2019/0081706 A1* | 3/2019 | Neilson ............. H04B 10/29 |
| 2022/0045753 A1* | 2/2022 | Coward ............. H04B 10/50 |

FOREIGN PATENT DOCUMENTS

| CN | 1545225 A | 11/2004 |
| CN | 201893790 U | 7/2011 |
| CN | 102487298 A | 6/2012 |
| CN | 103117796 A | 5/2013 |
| CN | 113411132 A | 9/2021 |
| JP | 2016046776 A | 4/2016 |
| JP | 2016096446 A | 5/2016 |

OTHER PUBLICATIONS

International Search Report and Written Opinion issued on Oct. 25, 2022, in corresponding International Application No. PCT/CN2022/076879, 33 pages.

* cited by examiner

*Primary Examiner* — Daniel G Dobson
(74) *Attorney, Agent, or Firm* — XSENSUS LLP

(57) ABSTRACT

The present disclosure provides an optical relay device, a signal transmission system and a method, belonging to the field of communication technology. The optical relay device includes: a first signal conversion part, used for modulating a received electrical signal converted from a microwave signal and converting the electrical signal to a laser signal for output; and a second signal conversion part, used for receiving the laser signal output by the first signal conversion part and converting the laser signal to an electrical signal for output.

18 Claims, 10 Drawing Sheets

OPTICAL RELAY DEVICE, SIGNAL TRANSMISSION SYSTEM AND METHOD

The present disclosure is a U.S. National Stage of International Application No. PCT/CN2022/076879, filed on Feb. 18, 2022, which relates to the field of communication technology, and in particular to an optical relay device, a signal transmission system and method.

TECHNICAL FIELD

Background

The 5G signals have high frequency and short wavelength. When the 5G signals pass through glass and other obstacles, the loss is high and the signal attenuation is extremely fast. This makes the signal strength of 5G signals weak after the 5G signals reach indoors through glass, which cannot meet the demand for high-speed internet access indoors. This is a problem that needs to be addressed urgently during the promotion of 5G communication.

The above information disclosed in the background technology part is intended only to enhance the understanding of the background of the present disclosure and may therefore include information that does not constitute prior art known to those of ordinary skill in the art.

SUMMARY

It is an object of the present disclosure to provide an optical relay device, a signal transmission system and method.

In order to achieve the above object of the disclosure, the present disclosure adopts the following technical solutions.

According to a first aspect of the present disclosure, there is provided an optical relay device, including:
  a first signal conversion part, used for modulating a received electrical signal converted from a microwave signal and converting the electrical signal to a laser signal for output; and
  a second signal conversion part, used for receiving the laser signal output by the first signal conversion part and converting the laser signal to an electrical signal for output.

In an example embodiment of the present disclosure, the laser signal output by the first signal conversion part is an infrared waveband laser signal.

In an example embodiment of the present disclosure, the optical relay device further includes:
  an optical fiber transmission part, connecting the first signal conversion part and the second signal conversion part, used for transmitting the laser signal output by the first signal conversion part to the second signal conversion part.

In an example embodiment of the present disclosure, the optical relay device further includes:
  an optical path alignment part, including a first displacement stage used for adjusting a position of the first signal conversion part and a second displacement stage used for adjusting a position of the second signal conversion part, wherein the optical path alignment part is used for aligning an optical path of the first signal conversion part for outputting the laser signal and an optical path of the second signal conversion part for receiving the laser signal.

In an example embodiment of the present disclosure, the optical relay device is provided with an indicator light, wherein the indicator light lights up in response to determining that the optical path of the first signal conversion part for outputting the laser signal and the optical path of the second signal conversion part for receiving the laser signal are aligned.

In an example embodiment of the present disclosure, the optical relay device further includes:
  an infrared detection part, used for converting the infrared waveband laser signal converted by the first signal conversion part to a visible light.

In an example embodiment of the present disclosure, the first signal conversion part includes:
  a first receiving unit, used for receiving the electrical signal converted from the microwave signal;
  a first electro-optical conversion unit, used for modulating the electrical signal received by the first receiving unit and converting the electrical signal to the laser signal for output.

In an example embodiment of the present disclosure, the second signal conversion part includes:
  a second receiving unit, used for receiving the laser signal output by the first signal conversion part;
  a second photoelectric conversion unit, used for converting the laser signal received by the second receiving unit to the electrical signal;
  an amplifier, used for amplifying and outputting the electrical signal converted by the second photoelectric conversion unit.

In an example embodiment of the present disclosure, the optical relay device further includes:
  a first signal processing part, used for acquiring the electrical signal converted from the microwave signal, and filtering and amplifying the electrical signal for output;
  a second signal processing part, used for receiving the electrical signal output by the first signal processing part, and digitally processing the electrical signal and outputting the electrical signal to the first signal conversion part.

In an example embodiment of the present disclosure, the first signal processing part includes:
  a signal acquisition unit, used for acquiring the electrical signal converted from the microwave signal;
  a first filtering unit, used for filtering and outputting the electrical signal acquired by the signal acquisition unit;
  a first amplification unit, used for signal amplification and output of the electrical signal acquired by the signal acquisition unit,
  wherein the second signal processing part includes:
  a first processing chip, integrated with software and hardware interfaces, wherein the first processing chip is used for receiving the electrical signal output by the first signal processing part, and representing and processing the electrical signal in a digital form for output.

In an example embodiment of the present disclosure, the optical relay device further includes:
  a third signal processing part, used for receiving the electrical signal output by the second signal conversion part, and digitally processing the electrical signal for output;
  a fourth signal processing part, used for receiving the electrical signal output by the third signal processing part, and filtering and amplifying the electrical signal for output.

In an example embodiment of the present disclosure, the third signal processing part includes:

a second processing chip, integrated with software and hardware interfaces, wherein the second processing chip is used for receiving the electrical signal output by the second signal conversion part, and representing and processing the electrical signal in a digital form for output, wherein the fourth signal processing part includes:

a signal receiving unit, used for receiving the electrical signal output by the third signal processing part;

a second filtering unit, used for filtering and outputting the electrical signal received by the signal receiving unit;

a second amplification unit, used for signal amplification and output of the electrical signal received by the signal receiving unit.

In an example embodiment of the present disclosure, the microwave signal is a 5G signal.

According to a second aspect of the present disclosure, there is provided a signal transmission system, including a communication station and an optical relay device according to the first aspect, wherein the communication station includes a first communication station for sending and receiving the electrical signal and a second communication station for sending and receiving the electrical signal;

the optical relay device relays the electrical signal output by the first communication station to the second communication station, and relays the electrical signal output by the second communication station to the first communication station.

In an example embodiment of the present disclosure, the communication station includes:

a microwave signal transceiver part, used for receiving and sending the microwave signal;

a photoelectric conversion part, used for receiving and sending the microwave signal and the electrical signal, and achieving two-way conversion between the microwave signal and the electrical signal.

According to a third aspect of the present disclosure, there is provided a signal transmitting method, including:

converting a microwave signal to an electrical signal for output;

receiving the electrical signal converted by the microwave signal, modulating the electrical signal and converting the electrical signal to a laser signal for output;

receiving the laser signal and converting the laser signal to an electrical signal for output;

receiving the electrical signal converted by the laser signal and converting the electrical signal to a microwave signal for output.

In an example embodiment of the present disclosure, the laser signal is an infrared waveband laser signal.

In an example embodiment of the present disclosure, the microwave signal is a 5G signal.

BRIEF DESCRIPTION OF THE DRAWINGS

The above and other features and advantages of the present disclosure will become more apparent by a detailed description of its example embodiments with reference to the accompanying drawings.

Figure 1:
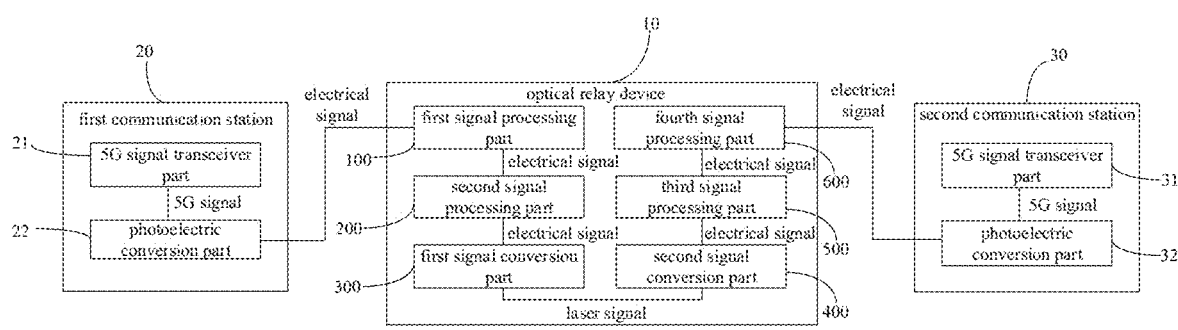
FIG. 1 is a structural schematic diagram of the optical relay device implementing the relay between a first communication station and a second communication station in an example embodiment of the present disclosure.

The numeral references of main components in the figures are illustrated as follows.

10—optical relay device; 100—first signal processing part; 110—signal acquisition unit; 120—first filtering unit; 130—first amplification unit; 200—second signal processing part; 210—first processing chip; 300—first signal conversion part; 310—first receiving unit; 320—first electro-optical conversion unit; 400—second signal conversion part; 410—second receiving unit; 420—second photoelectric conversion unit; 500—third signal processing part; 510—second processing chip; 600—fourth signal processing part; 610—signal receiving unit; 620—second filtering unit; 630—second amplification unit; 700—optical path alignment part; 710—first displacement stage; 720—second displacement stage; 800—infrared detection part; 900—optical fiber transmission part; 01—indicator light; 20—first communication station; 21—microwave signal transceiver part; 22—photoelectric conversion part; 30—second communication station; 31—microwave signal transceiver part; 32—photoelectric conversion part.

DETAILED DESCRIPTION

The example embodiments will now be described more fully with reference to the accompanying drawings. However, the example embodiments can be implemented in a variety of forms and should not be construed as being limited to the examples set forth herein; rather, the provision of these embodiments makes the present disclosure more comprehensive and complete and communicates the ideas of the example embodiments in a comprehensive manner to those skilled in the art. The features, structures or characteristics described may be combined in any suitable manner in one or more embodiments. In the following description, many specific details are provided so as to give a full understanding of the embodiments of the present disclosure.

In the drawings, the thickness of the areas and layers may be exaggerated for clarity. Identical numeral references in the figures indicate the same or similar structures and thus their detailed description will be omitted.

The features, structures or characteristics described may be combined in any suitable manner in one or more embodiments. In the following description, many specific details are provided so as to give a full understanding of the embodiments of the present disclosure. However, those skilled in the art will appreciate that the technical embodiments of the present disclosure may be practiced without one or more of the particular details described, or that other methods, components, materials, etc. may be employed. In other instances, well-known structures, materials or operations are not shown or described in detail to avoid obscuring the main technical ideas of the present disclosure.

When a structure is "on" other structures, it may mean that a structure is integrally formed on other structures, or that a structure is "directly" provided on other structures, or that a structure is "indirectly" provided on other structures through another structure.

The terms "a", "an", "the" are used to indicate the presence of one or more elements/components/etc.; the terms "including" and "having" are used to indicate an open-ended inclusion and to mean that additional elements/components/etc. may exist in addition to the listed elements/components/etc. The terms "first" and "second" etc. are used as markers only and do not limit the number of the objects.

With the development of 1G, 2G, 3G, 4G and 5G, the radio frequencies used are getting higher and higher. The 5G have a wide frequency range and can be divided into two kinds. One kind is below 6 GHz, which is not too different from the current 2/3/4G, and another kind is above 24 GHz. The higher the frequency, the more abundant the frequency resources that can be used. The richer the frequency resources, the higher the transmission rate that can be achieved. The biggest problem of the communication in a high frequency band is that the transmission distance is significantly reduced and the coverage capability is significantly weakened. The number of 5G base stations required to cover the same area will greatly exceed that of 4G. Currently, 5G signal coverage is narrow, the loss is large and the signal attenuation is extremely fast when the 5G signals pass through glass and other obstacles due to the high frequency and short wavelength of the 5G signals. This makes the 5G signals weak when it reaches indoors through glass and cannot meet the demand for high-speed internet access indoors.

Figure 2:
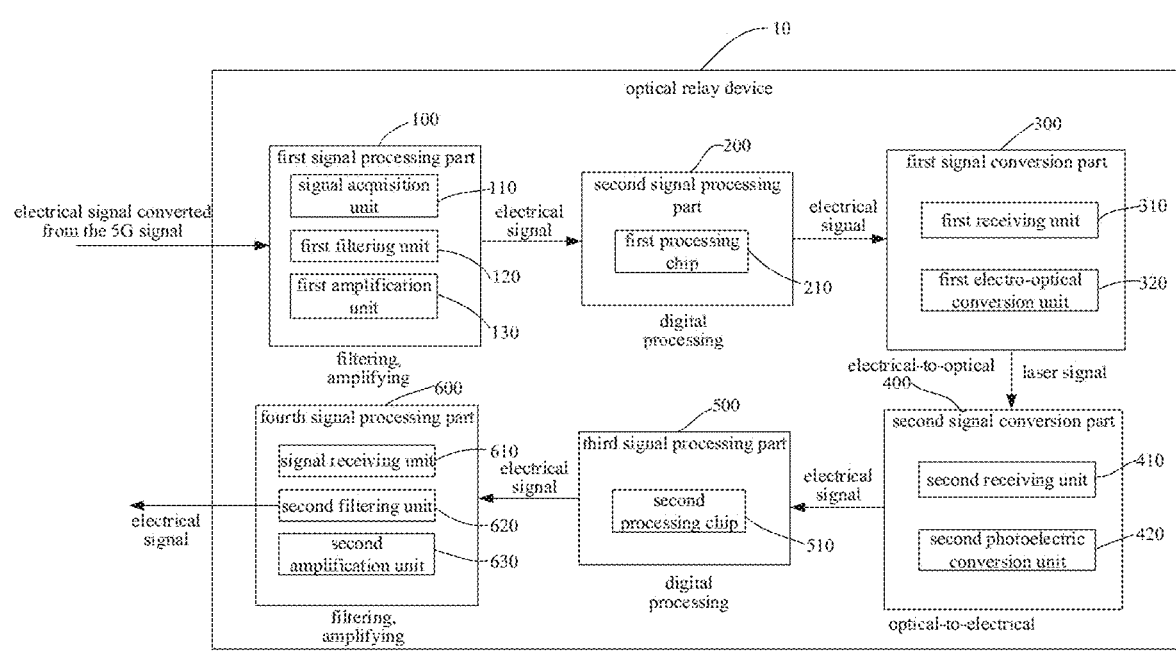
FIG. 2 is a structural schematic diagram of the optical relay device in an example embodiment of the present disclosure.

As shown in FIGS. 1 and 2, an optical relay device 10 is provided in this embodiment of the present disclosure, which can be used for transmission of microwave signals, such as 5G signals, to achieve high speed relay of 5G signals. The optical relay device 10 includes a first signal conversion part 300 and a second signal conversion part 400. The first signal conversion part 300 is used for modulating a received electrical signal converted from a microwave signal and converting the electrical signal to a laser signal for output. The second signal conversion part 400 is used for receiving the laser signal output by the first signal conversion part 300 and converting the laser signal to an electrical signal for output.

In the optical relay device 10 of the present disclosure, the electrical signal converted from the microwave signal is converted to a laser signal through the first signal conversion part 300. The laser signal has a high transmission rate in the glass. After the laser signal passes through the glass with low loss, the laser signal is converted to an electrical signal by the second signal conversion part 400 for output, which reduces the loss of the microwave signal in the normal penetration window and realizing the efficient transmission of the microwave signal.

The optical relay device 10 in the present disclosure can realize high-speed relay of 5G signals, which helps to solve the coverage problem of indoor 5G signals. At the same time, the device is installed on the glass of mobile tools such as cars, airplanes, ships, etc., which can realize real-time reception of 5G signals in outdoor mobile scenes.

The components of the optical relay device 10 provided in this embodiment of the present disclosure are described in detail below in conjunction with the accompanying drawings.

As shown in FIGS. 1 and 2, the optical relay device 10 provided by the present disclosure includes a first signal conversion part 300 and a second signal conversion part 400. The first signal conversion part 300 is used to convert an electrical signal to a laser signal and the second signal conversion part 400 is used to convert the laser signal to an electrical signal. That is, the first signal conversion part 300 and the second signal conversion part 400 achieve electrical-optical-electrical conversion. The converted laser signal can pass through obstacles such as glass, which helps to achieve high-speed relay of 5G signals indoors, in cars and other vehicles.

In practical applications, the first signal conversion part 300 and the second signal conversion part 400 can be placed at two sides of an obstacle such as glass. For example, the first signal conversion part 300 can be attached to the indoor side of glass and the second signal conversion part 400 can be attached to the outdoor side of glass. Alternatively, the first signal conversion part 300 and the second signal conversion part 400 can be positioned interchangeably, thus achieve high-speed relay of indoor microwave signals, such as 5G signals. The first signal conversion part 300 can also be attached to the inner side of the glass windows of vehicles such as cars, airplanes and ships, and the second signal conversion part 400 can be attached to the outer side thereof, so as to realize the reception of microwave signals anytime and anywhere during the movement of vehicles outdoors.

The first signal conversion part 300 is used for modulating a received electrical signal converted from a microwave signal and converting the electrical signal to a laser signal for output. The laser signal has a high throughput data transmission capability and the glass has a high transmission rate for the laser signal. The converted laser signal can carry data information to pass through the glass with low loss, enabling efficient transmission of microwave signals.

In some embodiments of the present disclosure, the laser signal converted from the first signal conversion part 300 may be an infrared waveband laser signal. The infrared waveband laser signal has very low loss when passing through the glass, which can improve the transmission efficiency of the microwave signals. The specific infrared waveband range of the laser signal can be set according to the actual situation. For example, in an embodiment of the present disclosure, the laser signal has a wavelength of 1310 nm or 1550 nm. The laser of this range can be used not only for wireless transmission but also for optical fiber transmission in the relevant technology. For example, the wavelength range commonly used for optical fiber communication in the related technology may include 810 nm, 1310 nm, 1490 nm or 1550 nm. When the wavelength of the laser signal converted from the first signal conversion part 300 of the present disclosure is 1310 nm or 1550 nm, the optical fiber in the related technology may be used for signal transmission, thereby facilitating integration with devices in the related technology, saving resources and reducing costs.

As shown in FIG. 2, in some embodiments of the present disclosure, the first signal conversion part 300 includes a first receiving unit 310 and a first electro-optical conversion unit 320. The first receiving unit 310 is used for receiving the electrical signal converted from the microwave signal. The first electro-optical conversion unit 320 is used for modulating the electrical signal received by the first receiving unit 310 and converting the electrical signal to the laser signal for output.

The first electro-optical conversion unit 320 includes a laser driver and a laser. The laser is driven by the laser driver to modulate the electrical signal received by the first receiving unit 310 and convert it to a laser signal for output. The laser can be a semiconductor laser (LD) or a light emitting diode (LED).

The laser driver mainly provides the laser with a suitable bias current and modulation current, so that the DC bias current is greater than the threshold current of the laser, and the laser operates in the linear region. The bias current is a constant current that pushes the operating range of the laser beyond its threshold and into the linear region. The modulation current is an alternating current that turns on or off in synchronization with the input voltage waveform.

The laser driver may include a bias current generator, a differential current switching circuit, an automatic power control circuit (APC) and a protection circuit, ect. The bias current generator is used to output a large enough DC bias current to the laser to meet the optical power requirements. The differential current switching circuit is used to output a modulation current to the laser. The automatic power control circuit (APC) is used to detect the magnitude of the output current of the backlight diode in the first electro-optical conversion unit 320 and dynamically adjust the magnitude of the laser driving current, to achieve stability of its output optical power. The protection circuit is used to protect the light emitting element, such as the light emitting diode, from being broken down. The specific protection circuit may connect the drive circuit and the light emitting element. When the voltage is greater than a certain value, the DC current flows to the protection circuit, thereby preventing the light emitting element or the like from being broken down.

In some embodiments of the present disclosure, the second signal conversion part 400 includes a second receiving unit 410 and a second photoelectric conversion unit 420. The second receiving unit 410 is used for receiving the laser signal output by the first signal conversion part 300. The second photoelectric conversion unit 420 is used for converting the laser signal received by the second receiving unit 410 to the electrical signal. The amplifier is used for amplifying and outputting the electrical signal converted by the second photoelectric conversion unit 420.

The second photoelectric conversion unit 420 can contain a photodiode and an amplifier. The laser signal with a certain intensity change is converted to an electrical signal with the corresponding intensity change under the action of a photodiode. The amplifier can be a trans-impedance amplifier (TIA). The TIA converts the electrical signal to a voltage signal and amplifies the converted voltage signal to the required amplitude, then transmits it to the limiting amplifier circuit via an impedance matching circuit to complete the re-amplification and shaping of the signal, which improves the signal-to-noise ratio and reduces the error rate. Finally, the electrical interface circuit completes the signal output, to output the electrical signal of varying strength.

Figure 3:
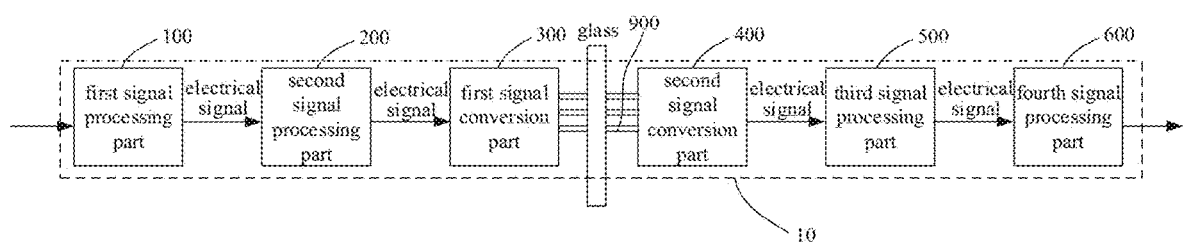
FIG. 3 is a structural schematic diagram of the first signal conversion part and the second signal conversion part using an optical fiber transmission part for signal transmission in the example embodiment of the present disclosure.

As shown in FIG. 3, in some embodiments of the present disclosure, the optical relay device 10 also includes an optical fiber transmission part 900 for laser signal transmission. The optical fiber transmission part 900 connects the first signal conversion part 300 and the second signal conversion part 400, and is used for transmitting the laser signal output by the first signal conversion part 300 to the second signal conversion part 400. In practical applications, holes can be punched in the glass of buildings or glass windows of the vehicles. The first signal conversion part 300 and the second signal conversion part 400 are placed at two sides of the glass windows, and the first signal conversion part 300 and the second signal conversion part 400 are connected to each other by the optical fiber. The laser signal converted by the first signal conversion unit 300 is transmitted to the second signal conversion unit 400 through the optical fiber. In this embodiment, the wavelength of the laser signal can be selected according to requirements of the optical fiber transmission. For example, the wavelength of the laser signal can be 1310 nm or 1550 nm.

The first signal conversion part 300 and the second signal conversion part 400 may also communicate with each other without through optical fibers. Since the laser signal can pass through the glass window with low loss, wireless communication between the first signal conversion part 300 and the second signal conversion part 400 is possible.

In practical applications, the optical path of the first signal conversion part 300 for outputting the laser signal can be aligned with the optical path of the second signal conversion part 400 for receiving the laser signal, to enable wireless transmission between the first signal conversion part 300 and the second signal conversion part 400. In practical applications, the optical paths between them two may be aligned by manual operation, or the optical paths between them two may also be aligned by other auxiliary tools, which is not limited in the present disclosure.

Figure 4:
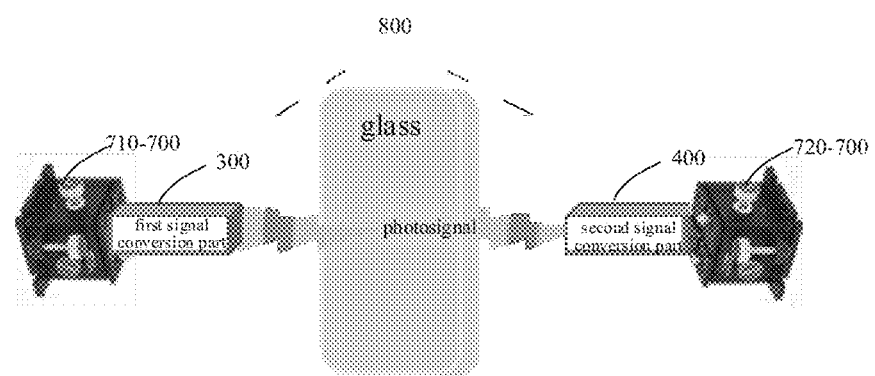
FIG. 4 is a structural schematic diagram of the first signal conversion part and the second signal conversion part using an optical path alignment part for optical path alignment in the example embodiment of the present disclosure.

As shown in FIG. 4, in some embodiments of the present disclosure, the optical relay device 10 also includes an optical path alignment part 700, including a first displacement stage 710 used for adjusting a position of the first signal conversion part 300 and a second displacement stage 720 used for adjusting a position of the second signal conversion part 400. The optical path alignment part 700 is used for aligning an optical path of the first signal conversion part 300 for outputting the laser signal and an optical path of the second signal conversion part 400 for receiving the laser signal. The diameters of optical ports of the first signal conversion part 300 and the second signal conversion part 400 are on the order of microns and manual alignment of the optical paths is extremely difficult. In this embodiment, the optical paths of the first signal conversion part 300 and the second signal conversion part 400 are aligned using the optical path alignment part 700, which can effectively enhance the alignment efficiency of the optical paths.

Specifically, the first signal conversion part 300 can be placed on the first displacement stage 710 and the second signal conversion part 400 can be placed on the second displacement stage 720, and the positions of the first signal conversion part 300 and the second signal conversion part 400 can be adjusted by the first displacement stage 710 and the second displacement stage 720 respectively, so as to align the optical paths of the first signal conversion part 300 for outputting the laser signal and the second signal conversion part 400 for receiving the laser signal.

The first displacement stage 710 and the second displacement stage 720 may be three-axis displacement stages. The three-axis displacement stages may independently adjust and fine-tune the optical paths of the first signal conversion part 300 and the second signal conversion part 400 in the X, Y and Z directions. Specifically, the first displacement stage 710 and the second displacement stage 720 can select high precision three-axis displacement stages with an adjustment precision in the nanometer order (precision<500 nm).

Figure 7:
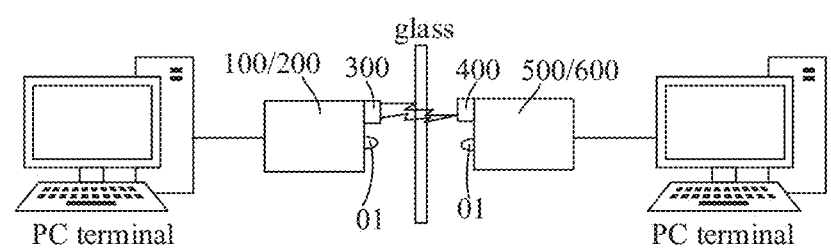
FIG. 7 is a structural schematic diagram for testing the effect of relaying by an optical relay device in another example embodiment of the present disclosure.
Figure 8:
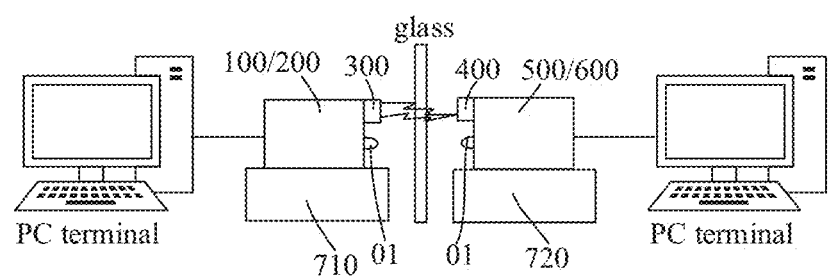
FIG. 8 is a structural schematic diagram for testing the effect of relaying by an optical relay device in still another example embodiment of the present disclosure.

As shown in FIGS. 7 and 8, in some embodiments of the present disclosure, the optical relay device 10 is also provided with an indicator light 01. Specifically, both the first signal conversion part 300 and the second signal conversion part 400 may be provided with an indicator light 01 correspondingly. The indicator light 01 lights up in response to determining that the optical path of the first signal conversion part 300 for outputting the laser signal and the optical path of the second signal conversion part 400 for receiving the laser signal are aligned. In this embodiment, the setting of the indicator light 01 facilitates the technician to determine whether the optical paths between the first signal conversion part 300 and the second signal conversion part 400 are aligned and improves the alignment efficiency.

As shown in FIG. 4, in some embodiments of the present disclosure, when the laser signal is an infrared waveband laser signal, the laser is invisible to the human eye. Therefore, the optical relay device 10 may also include an infrared detection part 800, for converting the infrared waveband laser signal converted by the first signal conversion part 300 to a visible light, to visualize the infrared waveband laser and provide assistance in aligning the optical paths of the first signal conversion part 300 and the second signal conversion part 400.

The infrared detection part 800 can be an infrared laser detection card, which may convert various invisible near infrared waveband beams to visible light, enabling effective detection, tracking, calibration and identification of infrared beams.

In some applications, the number of infrared detection parts 800 is two. The two infrared detection parts 800 can be placed at the output end of the laser signal of the first signal conversion part 300 and the input end of the laser signal of the second signal conversion part 400 respectively. The first signal conversion part 300 and the second signal conversion part 400 respectively convert the carrier infrared waveband laser of the signal to visible light through their respective corresponding infrared detection parts 800, to assist in the alignment of the optical paths of the first signal conversion part 300 and the second signal conversion part 400.

As shown in FIGS. 1 and 2, in some embodiments of the present disclosure, the optical relay device 10 further includes a first signal processing part 100 and a second signal processing part 200. The first signal processing part 100 is used for acquiring the electrical signal converted from the microwave signal, and filtering and amplifying the electrical signal for output. The second signal processing part 200 is used for receiving the electrical signal output by the first signal processing part 100, and digitally processing the electrical signal and outputting the electrical signal to the first signal conversion part 300. The first signal processing part 100 may include a signal acquisition unit 110, a first filtering unit 120 and a first amplification unit 130. The signal acquisition unit 110 is used for acquiring the electrical signal converted from the microwave signal. The signal acquisition unit 110 may include an antenna and other structures. The first filtering unit 120 is used for filtering and outputting the electrical signal acquired by the signal acquisition unit 110, which specifically enables a specific frequency component of the electrical signal acquired by the signal acquisition unit 110 to pass through and greatly attenuates other frequency components to complete the filtering. The first filtering unit 120 may include a filter. The first amplification unit 130 is used for signal amplification and output of the electrical signal acquired by the signal acquisition unit 110. The first amplification unit 130 may contain various amplifiers such as a low noise amplifier (LNA), a power amplifier (PA), etc. The low noise amplifier is an amplifier with a very low noise factor. In this disclosure, when amplifying weak signals, generally, amplifier's own noise may interfere seriously with the signal, so a low noise amplifier is used to reduce this noise and improve the signal-to-noise ratio of the output. The power amplifier performs power amplification of the electrical signal, to ensure the quality of the signal output from the first signal processing part 100.

The second signal processing part 200 performs digital processing. The second signal processing part 200 may represent and process the signal in a digital form. The second signal processing part 200 may include a first processing chip 210, such as a System on Chip (SoC), which integrates various software and hardware interfaces for receiving the electrical signal output from the first signal processing part 100 and representing and processing the electrical signal in a digital form, for example, to complete complex processing and logic operations of the digital signal.

Continuing as shown in FIGS. 1 and 2, in some embodiments of the present disclosure, the optical relay device 10 further includes a third signal processing part 500 and a fourth signal processing part 600. The third signal processing part 500 is used for receiving the electrical signal output by the second signal conversion part 400, and digitally processing the electrical signal for output. The fourth signal processing part 600 is used for receiving the electrical signal output by the third signal processing part 500, and filtering and amplifying the electrical signal for output.

The third signal processing part 500 performs digital processing. The third signal processing part 500 can represent and process the signal in a digital form. Similar to the second signal processing part 200, the third signal processing part 500 may include a second processing chip 510, such as a System on Chip (SoC), which integrates various software and hardware interfaces for receiving the electrical signal output from the second signal conversion part 400 and representing and processing the electrical signal in a digital form, for example, to complete complex processing and logic operations of the digital signal for output.

The fourth signal processing part 600 may include a signal receiving unit 610, a second filtering unit 620 and a second amplification unit 630. The signal receiving unit 610 is used for receiving the electrical signal output by the third signal processing part 500. The second filtering unit 620 is used for filtering and outputting the electrical signal received by the signal receiving unit 610, which specifically enables a specific frequency component of the electrical signal received by the signal receiving unit 610 to pass through and greatly attenuates other frequency components to complete the filtering. The second filtering unit 620 may include a filter. The second amplification unit 630 is used for signal amplification and output of the electrical signal received by the signal receiving unit 610. The second amplification unit 630 may contain various amplifiers such as a low noise amplifier (LNA), a power amplifier (PA), etc. The low noise amplifier is an amplifier with a very low noise factor. In this disclosure, when amplifying weak signals, generally, amplifier's own noise may interfere seriously with the signal, so a low noise amplifier is used to reduce this noise and improve the signal-to-noise ratio of the output. The power amplifier performs power amplification of the electrical signal.

The present disclosure provides an optical relay device 10 that enables wireless window-penetrating communication of microwave signals between the communication device and the base station.

The following will illustrate the wireless window-penetrating communication between the base station and the communication device by the optical relay device 10 of the present disclosure in conjunction with the accompanying drawings and specific application scenarios.

Figure 5:
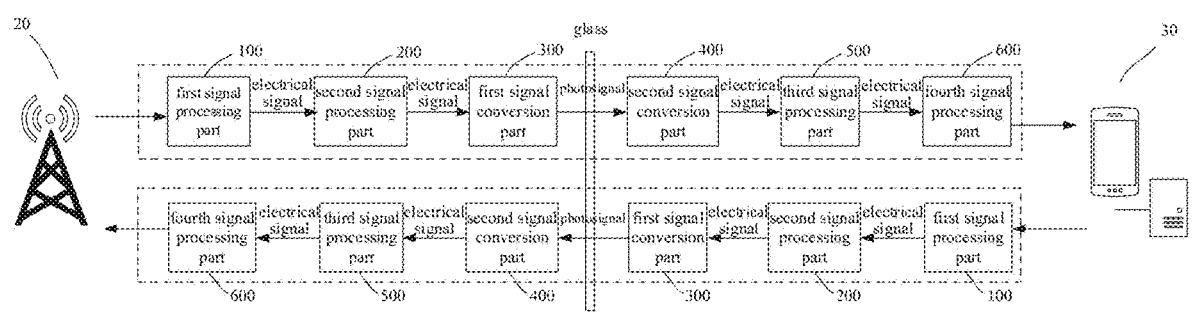
FIG. 5 is a structural schematic diagram of the first communication station and the second communication station using an optical relay device for relaying in the example embodiment of the present disclosure.

As shown in FIGS. 1 and 5, the present disclosure also provides a signal transmission system including a communication station and an optical relay device 10 in any of the above embodiments. The communication station includes a first communication station 20 for sending and receiving the electrical signal and a second communication station 30 for sending and receiving the electrical signal. The optical relay device 10 relays the electrical signal output by the first communication station 20 to the second communication station 30, and relays the electrical signal output by the second communication station 30 to the first communication station 20.

In some embodiments of the present disclosure, the communication station includes a microwave signal transceiver part and a photoelectric conversion part. The microwave signal transceiver part is used for receiving and sending the microwave signal, such as the 5G signal. The photoelectric conversion part is used for receiving and sending the microwave signal and the electrical signal, and achieving two-way conversion between the microwave signal and the electrical signal. Specifically, the first communication station 20 includes a microwave signal transceiver part 21 and a photoelectric conversion part 22, and the second communication station 30 includes a microwave signal transceiver part 31 and a photoelectric conversion part 32.

The first communication station 20 and the second communication station 30 may be a communication station including a base station or a communication device. For example, the first communication station 20 is a communication point containing a base station and the second communication station 30 is a communication point containing a communication device, such as a mobile phone, computer, etc.

The microwave signal transceiver part 21 contained in the first communication station 20 may be a 5G base station. The base station may send or receive 5G microwave signals. The photoelectric conversion unit 22 contained in the first communication station 20 may be a receiving antenna and a sending antenna, or a transceiver integrated antenna. The receiving antenna can receive the 5G signal sent by the base station and convert it to the electrical signal. The sending antenna can convert the electrical signal to the 5G signal and send it out. The transceiver integrated antenna can receive and send the 5G signal and electrical signal, and realize two-way conversion between them two.

The microwave signal transceiver part 31 contained in the second communication station 30 may be a communication tool such as a mobile phone, which may send or receive the 5G signal. The photoelectric conversion unit 32 contained in the second communication station 30 may be a receiving antenna and a sending antenna, or a transceiver integrated antenna. The receiving antenna can receive the 5G signal sent by the communication device such as a mobile phone and convert it to the electrical signal. The sending antenna can convert the electrical signal to the 5G signal and send it out. The transceiver integrated antenna can receive and send the 5G signal and electrical signal, and realize two-way conversion between them two. It should be noted here that the first communication station 20 and the second communication station 30 are interchangeable, and both the first communication station 20 and the second communication station 30 can also be communication points containing communication tools such as mobile phones.

The first communication station 20 being a base station site and the second communication station 30 being a mobile phone communication tool site is taken as an example to illustrate the window-penetrating communication of microwave signals between the first communication station 20 and the second communication station 30.

As shown in FIG. 5, the microwave signal transceiver part 21 of the first communication station 20, i.e. the base station, emits a 5G microwave signal. A photoelectric conversion part 22, such as a transceiver integrated antenna, receives the 5G signal from the base station and converts it to an electrical signal and outputs it. The converted electrical signal is relayed to the second communication station 30 by the optical relay device 10.

Specifically, the first signal processing part 100 in the optical relay device 10 acquires the electrical signal output by the photoelectric conversion part 22 and filters and amplifies the electrical signal. For example, the signal acquisition unit 110 acquires the electrical signal output by the first communication station 20. The first filtering unit 120 filters the electrical signal acquired by the signal acquisition unit 110. The first amplification unit 130 is used for signal amplification the electrical signal acquired by the signal acquisition unit 110 and outputs it to the second signal processing part 200 of the optical relay device 10.

The second signal processing part 200 of the optical relay device 10 receives the electrical signal output by the first signal processing part 100, processes the electrical signal digitally, such as logic operations, and outputs it to the first signal conversion part 300 of the optical relay device 10. The first signal conversion part 300 receives the electrical signal output by the second signal processing part 200, modulates the electrical signal and converts it to a laser signal and outputs it. The laser signal may be transmitted to a second signal conversion part 400 through a glass window of a building or a vehicle, etc. The second signal conversion part 400 receives the laser signal output by the first signal conversion part 300, converts it to an electrical signal and outputs it.

Subsequently, the third signal processing part 500 of the optical relay device 10 receives the electrical signal output by the second signal conversion part 400, and outputs it after digital processing of the electrical signal. The fourth signal processing part 600 receives the electrical signal output from the third signal processing part 500, filters and amplifies the electrical signal, and then outputs it. Similarly, the electrical signal output from the third signal processing part 500 can be received by the signal receiving unit 610, filtered by the second filtering unit 620, power amplified by the second amplification unit 630, etc., and then output to the second communication station 30. The photoelectric conversion part 32 in the second communication station 30 converts this electrical signal to a 5G signal and outputs it to a 5G transceiver part 31 in the second communication station 30, such as a communication device such as a mobile phone, thereby completing a high-speed relay of the 5G signal between the first communication station 20 and the second communication station 30.

In addition, in order to verify the high-speed relaying effect of the optical relay device 10 provided by the present disclosure on the 5G signals, the present disclosure places the first signal conversion part 300 and the second signal conversion part 400 in the optical relay device 10 at two sides of the glass and connects different communication devices respectively, so as to verify the relaying effect of the optical relay device 10.

Figure 6:
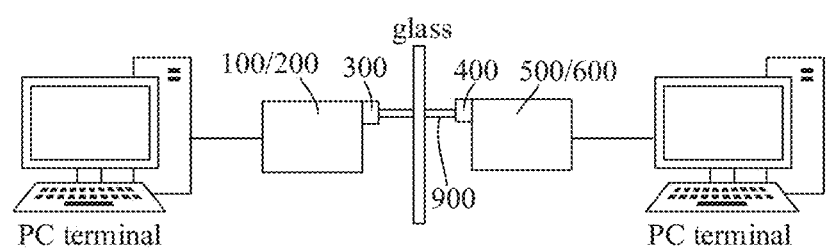
FIG. 6 is a structural schematic diagram for testing the effect of relaying by an optical relay device in an example embodiment of the present disclosure.

As shown in FIGS. 6 to 8, the first signal conversion part 300 and the second signal conversion part 400 are connected to different PC terminals, and the first signal conversion part 300 and the second signal conversion part 400 are positioned at two sides of the glass. The transmission between the first signal conversion part 300 and the second signal conversion part 400 may be carried out by means of an optical fiber transmission part 900 or wirelessly.

As shown in FIG. 6, the transmission between the first signal conversion part 300 and the second signal conversion part 400 is carried out via an optical fiber transmission part 900, specifically by drilling a hole in the glass through which the optical fiber transmission part 900 passes through the glass. Two ends of the optical fiber transmission part 900 are respectively connected to the first signal conversion part 300 and the second signal conversion part 400. In specific implementation, it was found that in 5G environment, the transmission rate of the two PCs using the optical fiber transmission part 900 to transmit files was approximately 100 MB/S, and the time required to transmit a file of 3.13G was 32 s.

As shown in FIGS. 7 and 8, the transmission between the first signal conversion part 300 and the second signal conversion part 400 is carried out wirelessly. In FIG. 7, the optical paths of the first signal conversion part 300 and the second signal conversion part 400 can be aligned manually, and the alignment process can be assisted by an infrared detection part 800. When the optical paths of the first signal conversion part 300 and the second signal conversion part 400 are aligned, the indicator light 01 lights up and the two PCs may transmit files. In a specific implementation, it was found that when the first signal conversion part 300 and the second signal conversion part 400 transmit files wirelessly, the file transmission rate is approximately 97 MB/S, i.e. 776 Mb/s, and it takes only 33 s to transmit a 3.13G file, and the transmission rate is comparable to the transmission rate using the optical fiber transmission part 900.

An optical path alignment part 700 may be employed to align the optical paths of the first signal conversion part 300 and the second signal conversion part 400. As shown in FIG. 8, the positions of the first signal conversion part 300 and the second signal conversion part 400 are adjusted by means of the first displacement stage 710 and the second displacement stage 720 respectively, to align the optical paths of the first signal conversion part 300 and the second signal conversion part 400. When the optical paths of the first signal conversion part 300 and the second signal conversion part 400 are aligned, the indicator light 01 lights up. In a specific implementation, it was found that when the optical path alignment part 700 is used for the optical path alignment of the first signal conversion part 300 and the second signal conversion part 400, the transmission rate of the two PC terminals is comparable to the transmission rate of manually aligning the optical paths.

Figure 9:
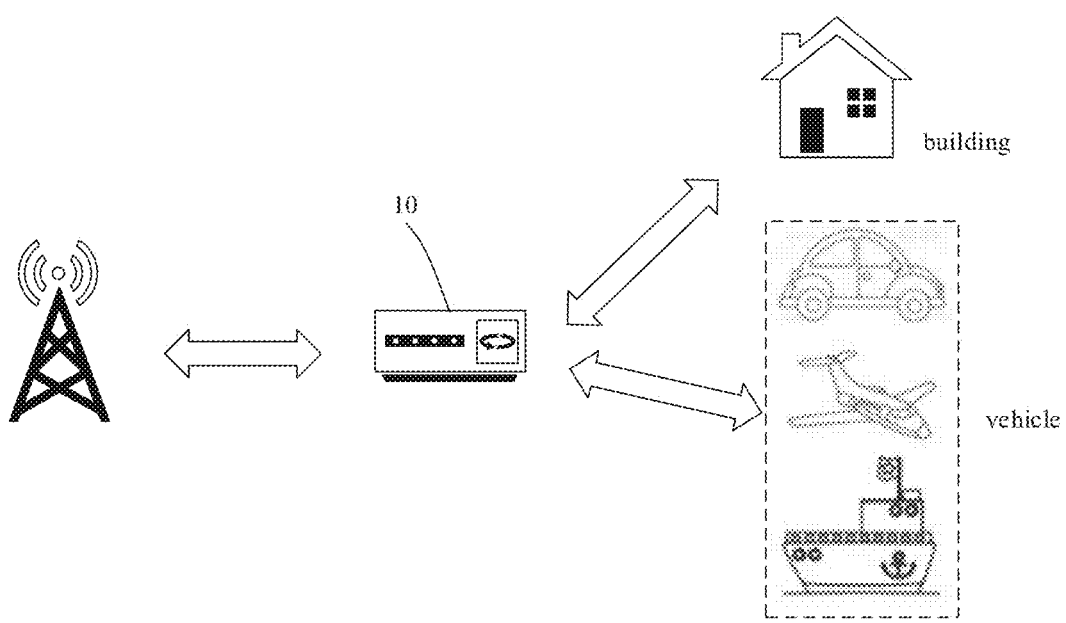
FIG. 9 is a structural schematic diagram of an application scenario of the optical relay device of the present disclosure.

As shown in FIG. 9, the optical relay device 10 provided by the present disclosure can be applied to a variety of scenarios, such as glass windows of buildings or windows of various vehicles, such as cars, airplanes, ships, etc. When the optical relay device 10 in the present disclosure is applied to a building, it helps to solve the indoor 5G signal coverage problem. When the optical relay device 10 in the present disclosure is applied to a vehicle, it helps to achieve real-time reception of 5G signals in outdoor mobile scenarios.

Figure 10:
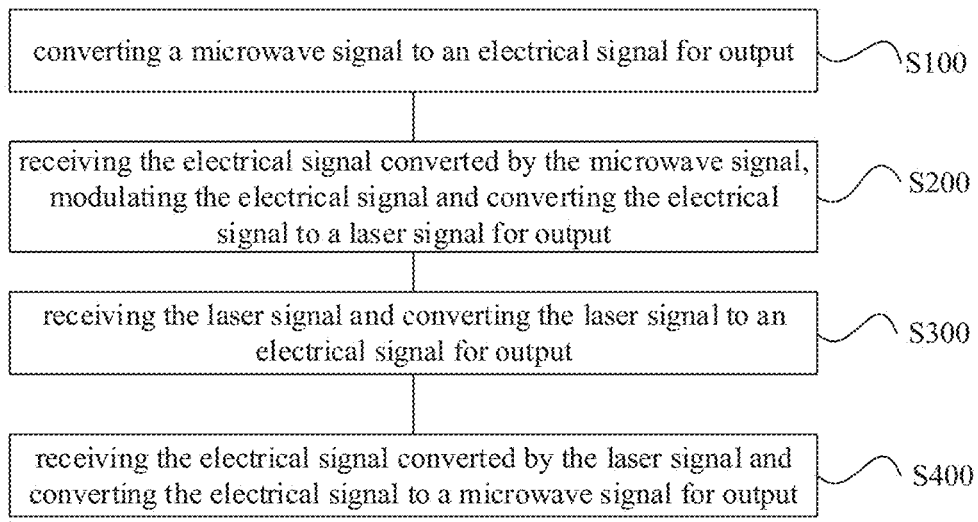
FIG. 10 is a schematic diagram of the flow of the signal transmission method in an example embodiment of the present disclosure.

As shown in FIG. 10, the present disclosure also provides a signal transmission method, including:

S100, converting a microwave signal to an electrical signal for output;

S200, receiving the electrical signal converted by the microwave signal, modulating the electrical signal and converting the electrical signal to a laser signal for output;

S300, receiving the laser signal and converting the laser signal to an electrical signal for output;

S400, receiving the electrical signal converted by the laser signal and converting the electrical signal to a microwave signal for output.

In some embodiments of the present disclosure, the microwave signal may be a 5G signal and the laser signal may be an infrared waveband laser signal. The signal transmission method of the present disclosure may be implemented using an optical relay device in any of the above embodiments.

In some embodiments of the present disclosure, operations such as filtering, amplifying and digital processing of the electrical signal converted from the microwave signal may be included between step S100 and step S200, in order to ensure the quality of the signal transmission. Similarly, operations such as digital processing, filtering, amplifying, etc. of the electrical signal converted from the laser signal may also be included between step S300 and step S400, in order to further ensure the quality of the signal transmission.

In the optical relay device of the present disclosure, the electrical signal converted from the microwave signal is converted to a laser signal through the first signal conversion part. The laser signal has a high transmission rate in the glass. After the laser signal passes through the glass with low loss, the laser signal is converted to an electrical signal by the second signal conversion part for output, which reduces the loss of the microwave signal in the normal penetration window and realizing the efficient transmission of the microwave signal.

It is to be noted that although the process of signal transmission of various parts in the present disclosure are depicted in the accompanying drawings in a particular order, it is not required or implied that the signal transmission must be performed in that particular order, or that all of the steps shown must be performed to achieve the desired result. Additional or alternatively, certain steps may be omitted, multiple steps may be combined into one step for execution, and/or a single step may be broken down into multiple steps for execution, etc., all of which should be considered part of the present disclosure.

It should be appreciated that the present disclosure does not limit its application to the detailed construction and arrangement of the components presented in this specification. The present disclosure can have other embodiments and can be implemented and performed in a variety of ways. The foregoing variations and modifications fall within the scope of the present disclosure. It is to be understood that the present disclosure as disclosed and limited by this specification extends to all alternative combinations of two or more individual features mentioned or apparent in the text and/or the accompanying drawings. All such different combinations constitute a plurality of alternative aspects of the present disclosure. The embodiments of the present specification illustrate the best manner known for implementing the present disclosure and will enable those skilled in the art to make use of the present disclosure.

What is claimed is:

1. An optical relay device, comprising:
a first signal conversion part, used for modulating a received electrical signal converted from a microwave signal and converting the electrical signal to a laser signal for output;
a second signal conversion part, used for receiving the laser signal output by the first signal conversion part and converting the laser signal to an electrical signal for output;
a first signal processing part, used for acquiring the electrical signal converted from the microwave signal, and filtering and amplifying the electrical signal for output; and
a second signal processing part, used for receiving the electrical signal output by the first signal processing part, and digitally processing the electrical signal and outputting the electrical signal to the first signal conversion part,
wherein the first signal processing part comprises:
a signal acquisition unit, used for acquiring the electrical signal converted from the microwave signal; a first filtering unit, used for filtering and outputting the electrical signal acquired by the signal acquisition unit; a first amplification unit, used for signal amplification and output of the electrical signal acquired by the signal acquisition unit,
wherein the second signal processing part comprises:
a first processing chip, integrated with software and hardware interfaces, wherein the first processing chip is used for receiving the electrical signal output by the first signal processing part, and representing and processing the electrical signal in a digital form for output.

2. The optical relay device according to claim 1, wherein the laser signal output by the first signal conversion part is an infrared waveband laser signal.

3. The optical relay device according to claim 1, further comprising:
an optical fiber transmission part, connecting the first signal conversion part and the second signal conversion part, used for transmitting the laser signal output by the first signal conversion part to the second signal conversion part.

4. The optical relay device according to claim 1, further comprising:
an optical path alignment part, comprising a first displacement stage used for adjusting a position of the first signal conversion part and a second displacement stage used for adjusting a position of the second signal conversion part, wherein the optical path alignment part is used for aligning an optical path of the first signal conversion part for outputting the laser signal and an optical path of the second signal conversion part for receiving the laser signal.

5. The optical relay device according to claim 4, wherein the optical relay device is provided with an indicator light, wherein the indicator light lights up in response to determining that the optical path of the first signal conversion part for outputting the laser signal and the optical path of the second signal conversion part for receiving the laser signal are aligned.

6. The optical relay device according to claim 2, further comprising:
an infrared detection part, used for converting the infrared waveband laser signal converted by the first signal conversion part to a visible light.

7. The optical relay device according to claim 1, wherein the first signal conversion part comprises:
a first receiving unit, used for receiving the electrical signal converted from the microwave signal;
a first electro-optical conversion unit, used for modulating the electrical signal received by the first receiving unit and converting the electrical signal to the laser signal for output.

8. The optical relay device according to claim 1, wherein the second signal conversion part comprises:
a second receiving unit, used for receiving the laser signal output by the first signal conversion part;
a second photoelectric conversion unit, used for converting the laser signal received by the second receiving unit to the electrical signal;
an amplifier, used for amplifying and outputting the electrical signal converted by the second photoelectric conversion unit.

9. The optical relay device according to claim 1, further comprising:
a third signal processing part, used for receiving the electrical signal output by the second signal conversion part, and digitally processing the electrical signal for output;
a fourth signal processing part, used for receiving the electrical signal output by the third signal processing part, and filtering and amplifying the electrical signal for output.

10. The optical relay device according to claim 9, wherein the third signal processing part comprises:
a second processing chip, integrated with software and hardware interfaces, wherein the second processing chip is used for receiving the electrical signal output by the second signal conversion part, and representing and processing the electrical signal in a digital form for output,
wherein the fourth signal processing part comprises:
a signal receiving unit, used for receiving the electrical signal output by the third signal processing part;
a second filtering unit, used for filtering and outputting the electrical signal received by the signal receiving unit;
a second amplification unit, used for signal amplification and output of the electrical signal received by the signal receiving unit.

11. The optical relay device according to claim 1, wherein the microwave signal is a 5G signal.

12. A signal transmission system, comprising a communication station and an optical relay device, wherein the optical relay device comprises:
a first signal conversion part, used for modulating a received electrical signal converted from a microwave signal and converting the electrical signal to a laser signal for output;
a second signal conversion part, used for receiving the laser signal output by the first signal conversion part and converting the laser signal to an electrical signal for output;
a first signal processing part, used for acquiring the electrical signal converted from the microwave signal, and filtering and amplifying the electrical signal for output; and
a second signal processing part, used for receiving the electrical signal output by the first signal processing part, and digitally processing the electrical signal and outputting the electrical signal to the first signal conversion part, wherein the first signal processing part comprises:
a signal acquisition unit, used for acquiring the electrical signal converted from the microwave signal; a first filtering unit, used for filtering and outputting the electrical signal acquired by the signal acquisition unit; a first amplification unit, used for signal amplification and output of the electrical signal acquired by the signal acquisition unit, wherein the second signal processing part comprises:
a first processing chip, integrated with software and hardware interfaces, wherein the first processing chip is used for receiving the electrical signal output by the first signal processing part, and representing and processing the electrical signal in a digital form for output, wherein the communication station comprises a first communication station for sending and receiving the electrical signal and a second communication station for sending and receiving the electrical signal;

the optical relay device relays the electrical signal output by the first communication station to the second communication station, and relays the electrical signal output by the second communication station to the first communication station.

13. The signal transmission system according to claim 12, wherein the communication station comprises:
a microwave signal transceiver part, used for receiving and sending the microwave signal;
a photoelectric conversion part, used for receiving and sending the microwave signal and the electrical signal, and achieving two-way conversion between the microwave signal and the electrical signal.

14. A signal transmitting method, comprising:
converting a microwave signal to an electrical signal for output;
receiving the electrical signal converted by the microwave signal, modulating the electrical signal and converting the electrical signal to a laser signal for output;
receiving the laser signal and converting the laser signal to an electrical signal for output;
receiving the electrical signal converted by the laser signal and converting the electrical signal to a microwave signal for output,
wherein the signal transmitting method further comprises:
acquiring the electrical signal converted from the microwave signal;
filtering and outputting the acquired electrical signal;
signal amplifying and outputting the acquired electrical signal; and
receiving the output electrical signal, and representing and processing the electrical signal in a digital form for output.

15. The signal transmission method according to claim 14, wherein the laser signal is an infrared waveband laser signal.

16. The signal transmission method according to claim 14, wherein the microwave signal is a 5G signal.

17. The signal transmission system according to claim 12, wherein the laser signal output by the first signal conversion part is an infrared waveband laser signal.

18. The signal transmission system according to claim 12, wherein the optical relay device further comprises:
an optical fiber transmission part, connecting the first signal conversion part and the second signal conversion part, used for transmitting the laser signal output by the first signal conversion part to the second signal conversion part.

* * * * *